T. P. KNAPP.
MOTOR CYCLE SUPPORT.
APPLICATION FILED JUNE 28, 1915.
1,172,465.
Patented Feb. 22, 1916.
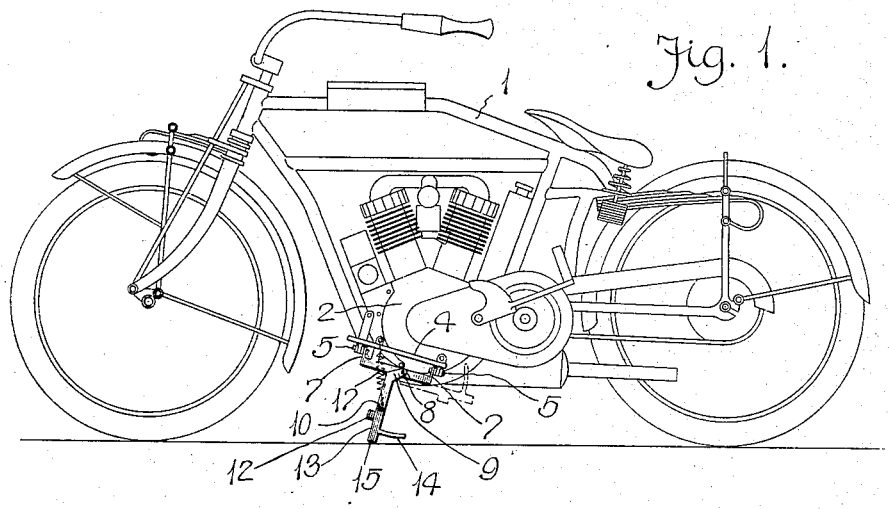
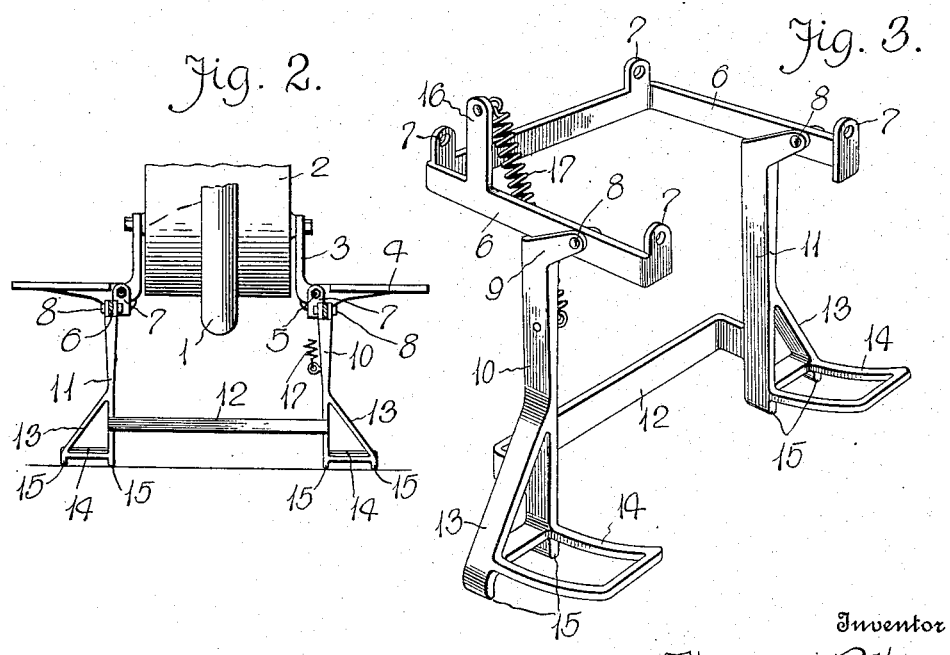
Witnesses
Chas. W. Stauffer
Karl H. Butler
Inventor
Thompson P. Knapp
By
Bartlett & Bartlett
Attorneys

UNITED STATES PATENT OFFICE.

THOMPSON P. KNAPP, OF HIGHLAND PARK, MICHIGAN.

MOTOR-CYCLE SUPPORT.

1,172,465.  Specification of Letters Patent.  Patented Feb. 22, 1916.

Application filed June 28, 1915. Serial No. 36,620.

*To all whom it may concern:*

Be it known that I, THOMPSON P. KNAPP, citizen of the United States of America, residing at Highland Park, in the county of Wayne and State of Michigan, have invented certain new and useful Improvements in Motor-Cycle Supports, of which the following is a specification, reference being had therein to the accompanying drawings.

This invention relates to a motorcycle support, and the primary object of my invention is to furnish a motorcycle or similar vehicle with a support that can be easily and quickly shifted to an active position without the rider or occupant of the motorcycle leaving the seat of the machine.

Another object of my invention is to provide a motorcycle with a novel support that can be readily swung to an inactive position, clear of a roadway or obstructions after an operator of a motorcycle is in position to start and control the operation of the motorcycle.

A further object of my invention is to provide a foot actuated support for a motorcycle and to locate the support between the wheels of the motorcycle and at such a point that an operator can manipulate the support preparatory to starting or stopping the motive power of the motorcycle.

The above and other objects are attained by a mechanical construction that will be hereinafter specifically described and then claimed, and reference will now be had to the drawing, wherein—

Figure 1 is a side elevation of a motorcycle provided with a support in accordance with my invention, showing the support in an active position by full lines and in an inactive position by dot and dash lines; Fig. 2 is an enlarged end view of the support, and Fig. 3 is a perspective view of a detached support.

In the drawing, 1 denotes, by the way of an example, an "Indian" motorcycle, having a crank case or frame 2 provided with hangers or bearings 3 to which are hinged or pivotally connected by bolts or pins 5 foldable foot rests or foot boards 4. The foot rests or foot boards are at the sides of the crank case or frame 2, and the hangers or bearings therefor are four in number. Utilizing bolts or pins of a greater length than now ordinarily used, I attach a frame 6 to said bolts or pins through the medium of apertured lugs 7. The frame 6 is disposed at an inclination and extends along the sides of the crank case 2 in front of the same.

Suitably connected to the sides of the frame 6, are the bifurcated ends 9 of supporting members 10 and 11, said members being connected, contiguous to the lower ends thereof, by a yoke 12. The lower ends of the supporting members 10 and 11 have side extensions 13 increasing the supporting area of the lower ends of said members. The side extensions 13 have rearwardly projecting foot pieces 14 of skeleton form to reduce the weight of the device. These foot pieces can coöperate with prongs 15 of the supporting members 10 and 11 in engaging the ground or surface to substantially support the motorcycle, but said foot pieces are intended to facilitate an operator or occupant of the motorcycle in swinging the device to an active position.

One side of the frame has a bracket 16 and connected to said bracket and the inner side of one of the supporting members, preferably the member designated 10, is a coiled retractile spring 17 adapted for holding the supporting members 10 and 11 raised in an inactive position, as shown by dot and dash lines in Fig. 1. With the supporting device in this position, the occupant of the motor cycle can raise the foot boards 4 and lower the supporting members 10 and 11, this being accomplished with the feet. When the supporting members 10 and 11 are in engagement with the ground, the occupant of a motorcycle can move the same rearwardly thereby causing the frame 6 to rest upon the upper ends of the supporting members 10 and 11 within the bifurcations thereof. With the supporting members 10 and 11 disposed at an inclination and at right angles to the frame 6, the motorcycle cannot accidentally move forward and the weight of the same is sufficient to maintain the supporting members in an active position, thereby preventing the motorcycle from accidentally tumbling over.

To start the motorcycle, it is only necessary for the occupant of the same to move the motor cycle forward until the supporting members 10 and 11 assume an angle the reverse of that shown by full lines in Fig. 1. Then the retractile spring 17 swings the supporting members to a raised and inactive position, maintaining the same elevated without interfering with the foot boards 4, which can be lowered and used in the ordinary manner.

I attach considerable importance to the fact that the supporting device is located centrally of the motorcycle and is foot actuated without an operator of the motorcycle leaving the seat thereof. Such an arrangement possesses many advantages that are impossible by the ordinary support generally placed at the rear axle of a motorcycle.

I would have it understood that my invention is not limited to an "Indian" or any particular type of motorcycle, and that while in the drawing there is illustrated a preferred embodiment of my invention, it is to be understood that the structural elements are susceptible to such changes, in size, shape and manner of assemblage as fall within the scope of the appended claims.

What I claim is:—

1. A motorcycle support comprising a frame adapted for attachment to the foot board supports of a motor cycle, supporting members pivoted to the sides of said frame, a yoke connecting said members adjacent the lower ends thereof, extensions on the lower outer sides of said connected members coöperating with said members in providing prongs, foot pieces carried by said extensions and the lower ends of said supporting members, and means connecting one of said supporting members and said frame adapted to hold said supporting members normally in a raised position.

2. A motor cycle support comprising a frame adapted for attachment to the foot-board supports of a motorcycle, supporting members pivoted to the sides of said frame, a yoke connecting said members adjacent the lower ends thereof, foot pieces carried by the lower ends of said supporting members, and means connecting one of said supporting members and said frame adapted to hold said supporting members normally in a raised position.

In testimony whereof I affix my signature in presence of two witnesses.

THOMPSON P. KNAPP.

Witnesses:
ANNA M. DORR,
KARL H. BUTLER.

Copies of this patent may be obtained for five cents each, by addressing the "Commissioner of Patents, Washington, D. C."